US012580130B2

(12) United States Patent
Paesler et al.

(10) Patent No.: US 12,580,130 B2
(45) Date of Patent: Mar. 17, 2026

(54) CAPACITOR ASSEMBLY, VEHICLE-DRIVE POWER ELECTRONICS DEVICE WITH A CAPACITOR ASSEMBLY

(71) Applicant: Vitesco Technologies Germany GmbH, Hannover (DE)

(72) Inventors: Thomas Paesler, Eckental (DE); Detlef Ludwig, Diepersdorf (DE)

(73) Assignee: VITESCO TECHNOLOGIES GERAMNY GMBH, Regensburg (DE)

( * ) Notice: Subject to any disclaimer, the term of this patent is extended or adjusted under 35 U.S.C. 154(b) by 242 days.

(21) Appl. No.: 17/925,650

(22) PCT Filed: May 10, 2021

(86) PCT No.: PCT/EP2021/062282
§ 371 (c)(1),
(2) Date: Nov. 16, 2022

(87) PCT Pub. No.: WO2021/233711
PCT Pub. Date: Nov. 25, 2021

(65) Prior Publication Data
US 2023/0187135 A1 Jun. 15, 2023

(30) Foreign Application Priority Data
May 20, 2020 (DE) ..................... 10 2020 206 364.8

(51) Int. Cl.
*H01G 4/228* (2006.01)
*H01G 4/32* (2006.01)
(Continued)

(52) U.S. Cl.
CPC .............. *H01G 4/228* (2013.01); *H01G 4/32* (2013.01); *H01G 4/38* (2013.01); *H02M 7/003* (2013.01)

(58) Field of Classification Search
CPC ........... H01G 4/228; H01G 4/32; H01G 4/38; H02M 7/003
See application file for complete search history.

(56) References Cited

U.S. PATENT DOCUMENTS

| | | | | |
|---|---|---|---|---|
| 8,154,846 B2 | 4/2012 | Fauer | ............................ | 361/302 |
| 2007/0284157 A1* | 12/2007 | Heller | .................... | H02K 7/006 |
| | | | | 180/54.1 |

(Continued)

FOREIGN PATENT DOCUMENTS

| | | | | |
|---|---|---|---|---|
| DE | 10 2010 021 958 | 12/2010 | ............... | H01G 4/35 |
| DE | 10 2017 212 595 | 1/2019 | ............. | H02K 11/30 |

(Continued)

OTHER PUBLICATIONS

Search Report for International Application No. PCT/EP2021/062282, 12 pages, Sep. 7, 2021.

(Continued)

*Primary Examiner* — Michael P Mcfadden
(74) *Attorney, Agent, or Firm* — Slayden Grubert Beard PLLC

(57) ABSTRACT

Various embodiments of the teachings herein include a capacitor assembly comprising: a capacitor extending at least partially around a space, the capacitor including first, positive-voltage-side current terminals and second, negative-voltage-side current terminals; a first bus bar electrically connected to the first current terminals; and a second bus bar electrically connected to the second current terminals. The first and the second busbar extend parallel to or obliquely to an end face of the space.

16 Claims, 5 Drawing Sheets

(51) Int. Cl.
    *H01G 4/38*        (2006.01)
    *H02M 7/00*      (2006.01)

(56)             References Cited

U.S. PATENT DOCUMENTS

| | | | |
|---|---|---|---|
| 2015/0228411 A1* | 8/2015 | Owen | H02K 11/0094 |
| | | | 361/306.3 |
| 2018/0122579 A1* | 5/2018 | Liu | H01G 9/145 |
| 2018/0146577 A1* | 5/2018 | Ide | H05K 7/20272 |
| 2022/0337167 A1* | 10/2022 | Mizuno | H05K 7/1427 |

FOREIGN PATENT DOCUMENTS

| | | | | |
|---|---|---|---|---|
| DE | 102017212595 A1 * | 1/2019 | | |
| EP | 2 893 620 | 7/2015 | ............ | H02K 11/02 |
| EP | 3 549 147 | 10/2019 | ............ | H01G 4/38 |
| JP | 2008 167641 | 7/2008 | ............ | H02M 7/48 |

OTHER PUBLICATIONS

Office Action for DE Application No. 10 2020 206 364.8, 6 pages, Oct. 28, 2021.

* cited by examiner

CAPACITOR ASSEMBLY, VEHICLE-DRIVE POWER ELECTRONICS DEVICE WITH A CAPACITOR ASSEMBLY

CROSS-REFERENCE TO RELATED APPLICATIONS

This application is a U.S. National Stage Application of International Application No. PCT/EP2021/062282 filed May 10, 2021, which designates the United States of America, and claims priority to DE Application No. 10 2020 206 364.8 filed May 20, 2020, the contents of which are hereby incorporated by reference in their entirety.

TECHNICAL FIELD

The present disclosure relates to capacitor assemblies. Various embodiments of the teachings herein include intermediate-circuit capacitor assemblies, capacitor assemblies, and/or power-inverter capacitor assemblies, e.g. for a power electronics device, a vehicle-drive power electronics device, a power inverter device, and/or a vehicle-drive power inverter device.

BACKGROUND

Annular capacitors, with a large capacitor winding in the form of a ring, are known and are used inter alia (for example as intermediate circuit capacitors) in power electronics devices of vehicle drives of electrically driven vehicles for operating and controlling electric drive motors of the drives. The annular capacitors have a plurality of terminal lugs, which form positive-voltage-side and negative-voltage-side current terminals of the respective annular capacitors. In this case, the terminal lugs are generally arranged distributed in a circumferential direction of the corresponding annular capacitors.

Due to the distances between the terminal lugs, in particular between the positive terminals on the one hand and the negative terminals on the other hand, the electrical connections to these terminal lugs create surface areas that increase the inductance of the capacitors. If such an annular capacitor is connected to clocked semiconductor switches of a power electronics device, for example a vehicle-drive power inverter device, then the great inductance of the capacitor can lead to switching overvoltages at the semiconductor switches when the semiconductor switches are switched. The overvoltages at the semiconductor switches can in turn lead to malfunctions and even failures in the power electronics devices. As is usual with all electrical devices, there is also the general requirement for the annular capacitors or the power electronics devices, in particular the power inverter devices of vehicle drives, to be highly reliable.

SUMMARY

The teachings of the present disclosure describe capacitor assemblies, power electronics devices, and/or power inverter devices for a vehicle drive with a capacitor assembly that is reliable, in particular with regard to the aforementioned problem. For example, some embodiments include a capacitor assembly (KA), having: a capacitor (KD), which is designed as extending at least partially around a space (HR); the capacitor (KD) having first, positive-voltage-side current terminals (SA1) and second, negative-voltage-side current terminals (SA2); a first bus bar (S1), which is electrically connected to the first current terminals (SA1); and a second bus bar (S2), which is electrically connected to the second current terminals (SA2); the first and the second busbar extending parallel or obliquely to and end face of the space (HR).

In some embodiments, the first current terminals (SA1) and/or the second current terminals (SA2) are distributed in a circumferential direction (UR1) of the space (HR).

In some embodiments, the first busbar (S1) and the second busbar (S2) are arranged in the space (HR) or in alignment in the axial direction (AR) of the space (HR).

In some embodiments, the first busbar (S1) and the second busbar (S2) are arranged overlapping one another.

In some embodiments, there is an electrically isolating insulation layer; the first busbar (S1), the insulation layer and the second busbar (S2) being arranged overlapping one another; and the insulation layer being arranged between the first busbar (S1) and the second busbar (S2), and the first busbar (S1) and the second busbar (S2) being physically connected to one another and at the same time electrically isolated from one another.

In some embodiments, the first busbar (S1) and the second busbar (S2) are arranged perpendicularly to the axial direction (AR).

In some embodiments, the first busbar (S1) has the shape of a star or circular disk with radially extending first contact portions (KA1), the first contact portions (KA1) each being physically and electrically connected to one of the first current terminals (SA1); and/or the second busbar (S2) is designed in the shape of a star or circular disk with radially extending second contact portions (KA2), the second contact portions (KA2) each being physically and electrically connected to one of the second current terminals (SA2).

In some embodiments, the first busbar (S1) having a first electrical terminal element (E1) for connecting a first current conductor and a first cutout (A1) for conducting a second current conductor through to a second electrical terminal element (E2); and the second busbar (S2) having the second terminal element (E2) for connecting the second current conductor and a second cutout (A2) for conducting the first current conductor through to the first terminal element (E1); the first terminal element (E1) and the second cutout (A2) being arranged one above the other in the axial direction (AR) of the space (HR), and the second terminal element (E2) and the first cutout (A1) being arranged one above the other in the axial direction (AR) of the space (HR).

In some embodiments, the first terminal element (E1) being formed as a third cutout in the first busbar, the third cutout having a smaller diameter than the second cutout (A2); and/or the second terminal element (E2) being formed as a fourth cutout in the second busbar, the fourth cutout having a smaller diameter than the first cutout (A1).

In some embodiments, the first cutout (A1) and the second cutout (A2) being partially aligned with one another in the axial direction (AR) of the space (HR).

In some embodiments, the first busbar (S1) and/or the second busbar (S2) being stamped, cut or laser-beam cut from a metal sheet, a copper sheet or a copper alloy sheet.

In some embodiments, the capacitor (KD) has a plurality of capacitor elements (KE) which are physically separate from one another and which are arranged extending around the space (HR).

In some embodiments, the capacitor (KD) furthermore has a capacitor holder (KH) for holding the capacitor elements (KE), which has a plurality of holder portions (HA), which each support and securely hold one of the capacitor elements (KE), and a plurality of connecting portions (VA), which physically connect the holder portions (HA) to one another.

In some embodiments, the holder portions (HA) and the connecting portions (VA) being arranged alternately extending around the space (HR).

In some embodiments, the holder portions (HA) each enclosing one of the capacitor elements (KE) in its respective circumferential direction (UR2) at least partially in the manner of a casing.

In some embodiments, the holder portions (HA) each having at least one first expansion compensation area (DB), which is designed as narrower and/or thinner in comparison with the rest of the respective capacitor holder (KH) and is set up to compensate for expansion of the respective corresponding capacitor element (KE) in its circumferential direction (UR2).

In some embodiments, the connecting portions (VA) each having at least one second expansion compensation area, which is designed as narrower and/or thinner in comparison with the rest of the respective connecting portion (VA) and is set up to compensate for expansion of the capacitor elements (KE) or the capacitor (KD) in a circumferential direction (UR1) of the capacitor (KD).

As another example, some embodiments include a vehicle-drive power electronics (FV) device having: a capacitor assembly (KA) as claimed in one of the preceding claims; and an inverter (LI) for converting a direct current into a multi-phase alternating current and/or vice versa, which has direct-current terminals for transferring the direct current; the capacitor assembly (KA) being electrically connected to the direct-current terminals.

BRIEF DESCRIPTION OF THE DRAWINGS

Exemplary embodiments of the teachings herein are explained in more detail below with reference to the accompanying drawings. In the drawings.

DETAILED DESCRIPTION

Figure 1:
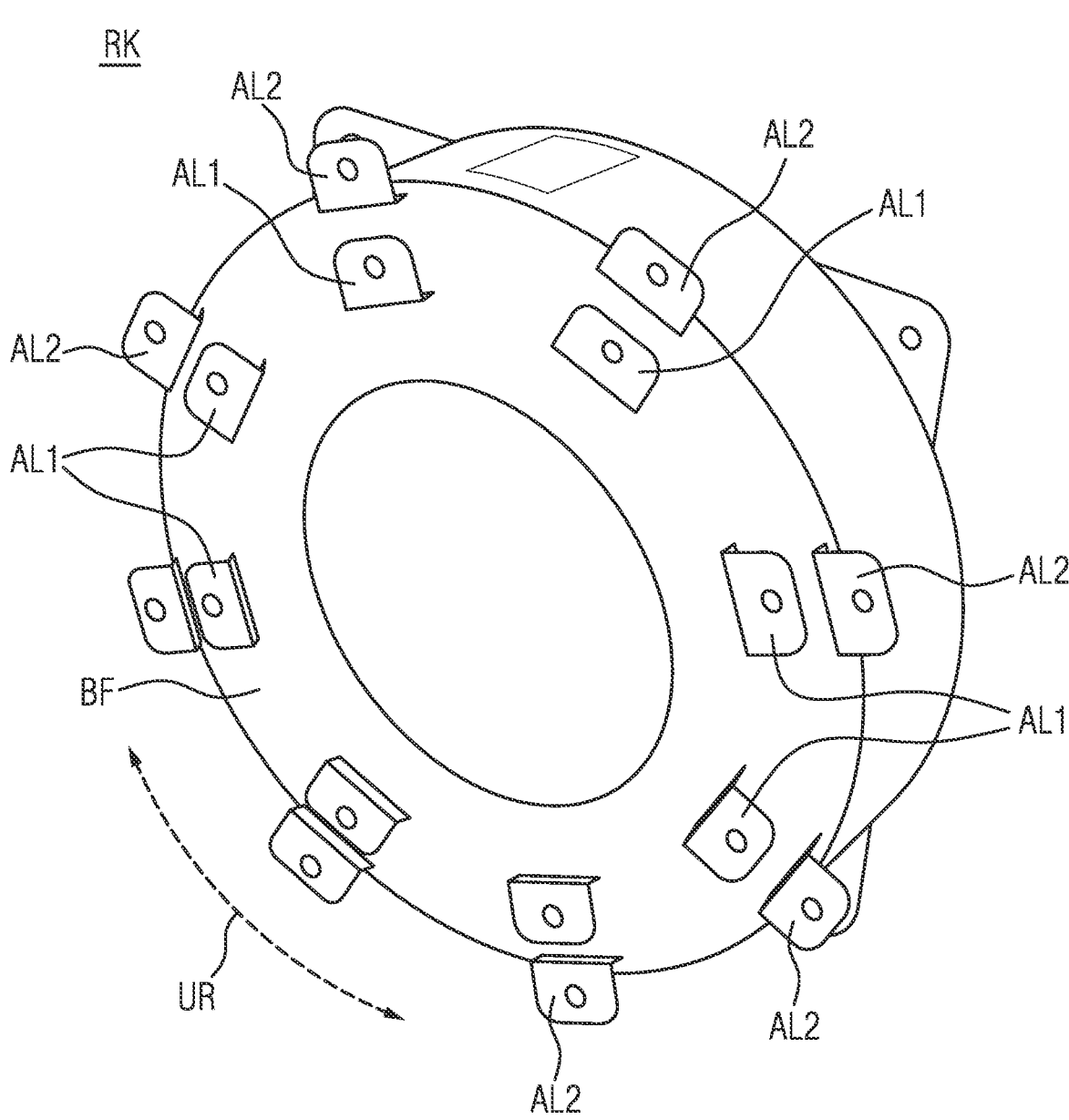
FIG. 1 shows a conventional annular capacitor in a schematic three-dimensional view from below.

Teachings of the present disclosure include a capacitor assembly, e.g. an intermediate-circuit capacitor assembly, an inverter capacitor assembly or a power-inverter capacitor assembly, in particular for a power electronics device, for example for a vehicle-drive power electronics device, specifically for a vehicle-drive power inverter device. The capacitor assembly has a capacitor, which is designed as extending at least partially around a space, in particular a cavity. The capacitor in turn has (one or a plurality of) first, positive-voltage-side current terminals (in particular in the form of terminal lugs) and (one or a plurality of) second, negative-voltage-side current terminals (in particular in the form of terminal lugs). The first current terminals and the second current terminals are preferably arranged distributed in a circumferential direction of the space.

In some embodiments, the capacitor assembly furthermore has a first busbar and a second busbar. The first busbar and the second busbar are in particular arranged in the space. The busbars are aligned with an end face or a cross section of the space in an axial direction of the space or of the capacitor. The busbars each extend along a surface area obtained by a section through the space transversely to the axial direction of the space. In other words, the busbars are arranged parallel to an end face of the space or (in particular slightly) obliquely to the end face of the space. In this case, "obliquely" means in particular that the angle between the surface area along which the respective busbar extends and the area of extent of the end face is no more than 90° (preferably no more than 45° or 30°). The first busbar and the second busbar are (in the axial direction) in particular arranged overlapping one another or one above the other and are predominantly (at least partially) or completely aligned with one another (in the axial direction). The first busbar is physically and electrically connected to the first current terminals (in particular directly), for example welded, soldered, screwed or riveted. Similarly, the second busbar is physically and electrically connected to the second current terminals (in particular directly), for example welded, soldered, screwed or riveted. The busbars may extend radially, for instance in a star shape, from the longitudinal axis of the space to the current terminals.

In particular, both the first and the second busbar are located in the space of the capacitor assembly, for instance on an end face of the space or between the two end faces of the space. All or at least many of the first current terminals are electrically connected to the first busbar, in particular via one of the contact portions of the first busbar in each case. Analogously, all or at least many of the second current terminals are electrically connected to the second busbar, in particular via one of the contact portions of the second busbar in each case.

The capacitor is designed in particular as an annular capacitor (in particular with a cylindrical cavity) with terminal lugs, the terminal lugs forming positive-voltage-side and negative-voltage-side current terminals of the capacitor. The terminal lugs are in this case arranged distributed on a circular or annular disk-shaped bottom side of the annular capacitor. In particular, two terminal lugs each form a group of one positive-voltage-side and one negative-voltage-side current terminal of capacitor angles of the annular capacitor. The terminal lug groups are in this case arranged equidistantly from one another on the bottom side of the annular capacitor, distributed in the form of a ring, with one (for example positive-voltage-side) terminal lug of the respective terminal lug groups, when viewed from the axis of the capacitor, arranged behind the other (for example negative-voltage-side) terminal lug of the same terminal lug groups.

The capacitor may, for example, have a plurality of capacitor windings. In this case, the first, positive-voltage-side current terminals form positive-voltage-side terminal lugs of the respective capacitor windings. Analogously, the second, negative-voltage-side current terminals form negative-voltage-side terminal lugs of the respective capacitor windings. The two busbars electrically connect the capacitor windings to one another in parallel.

The first and the second busbar may run parallel to one another. The two busbars may be arranged parallel to one another, resulting in good radiation properties with regard to electromagnetic radiation. In particular, the two busbars are stamped, cut or laser-beam cut from a metal sheet, for example a copper sheet or a copper alloy sheet. The busbars may lie one on top of the other and are electrically isolated from one another, in particular by means of an insulation layer lying between them.

The arrangement of the first busbar and the second busbar (and thus the electrical connections to the capacitor) in the space of the capacitor assembly, with the busbars being aligned with one another in the axial direction of the space, allows a space-saving construction of the capacitor assembly and increased design flexibility of the capacitor assembly, in particular in that the electrical connections to the capacitor can be routed through the space and can be established via the two busbars.

Provided in the interior of the capacitor assembly described here are the busbars, which are connected to the (ends of) the capacitor windings. The interior is also generally referred to here as a "cavity" (even more generally as a "space"). The end faces of the capacitor assembly are also counted as part of the interior or the cavity. The capacitor windings surround the interior of the capacitor or the capacitor assembly. The term "cavity" should be understood in particular as meaning that there is the possibility of guiding the busbars or the conductors. The interior of the capacitor may be free and receive the busbars or conductors, or may be partially or completely filled (for instance with filling material) except for the space for the busbars or conductors and possibly further components. The term "hollow" means here that the capacitor surrounds the relevant space in which the busbars are provided. A space is therefore referred to as hollow if it has no filling compound, or which is hollow from an electrical point of view and has space for conductors such as the busbars and/or the current conductors to be guided. The busbars or the current conductors may be exposed or be completely or partially embedded in filling compound. The term "interior" may also be used instead of the term "cavity".

The hollow space or the interior makes it possible, at least on one end face, to lead out contacts for the busbars such as the current conductors. This end face may correspond to an end face of a hollow cylinder, the body of which is formed by the capacitor. The busbars have terminal elements for current conductors. These current conductors may extend away from the busbars to an end face of the cavity, and may be electrically contacted there. The current conductors lead to an end face of the capacitor assembly, and thus allow routing over very short distances with low parasitic inductance, and thus offer a favorable central connection option. Since the current conductors run inside the capacitor, the capacitor elements provide shielding.

In some embodiments, the current conductors run parallel to one another. In particular, the current conductors may lie one on top of the other. The current conductors may be separated from one another by an insulator. An isolator track or other insulating body may be interposed between the current conductors and physically connect the current conductors to one another, e.g. directly. The current conductors may be routed along the longitudinal axis or along an axial direction of the cavity or space. The current conductors may run parallel to the longitudinal axis or along a direction which has a directional component that extends along the axial direction. The current terminals of the capacitor may lie on one end face, with the current conductors leading to the opposite end face. The current terminals of the capacitor may lie at least partially between two end faces, with the current conductors leading to at least one of the end faces (possibly to different end faces).

The mutually overlapping or (in the axial direction) aligned arrangement of the two busbars reduces the disruptive inductance in the electrical connections to the capacitor, and thus in the entire capacitor assembly. In the case of a capacitor with a plurality of capacitor windings, the two busbars also allow a low-inductance, parallel electrical connection of the capacitor windings to one another. The parallel connection of the capacitor windings reduces the inductance of the electrical connection between the capacitor windings, and thus the total inductance of the capacitor assembly. The guiding of the current conductors through the interior of the capacitor, which is formed as a hollow cylinder, minimizes the length of the electrical connection, as a result of which the inductance can be reduced, and shielding is furthermore provided by the capacitor windings themselves.

Thanks to the low inductance, the capacitor assembly described above can be used in a power electronics device, for example a vehicle-drive power inverter device, with clocked semiconductor switches, limiting the risk of switching overvoltages at the semiconductor switches and the accompanying malfunctions or failures in the power electronics device as a result of its low inductance. The capacitor assembly thus increases the reliability of the power electronics device.

In some embodiments, the capacitor assembly has an electrically isolating insulation layer, for example in the form of an insulating film, which is arranged between the first busbar and the second busbar. The insulation layer physically connects the first bus bar and the second bus bar to one another and electrically isolates the first bus bar and the second bus bar from one another. In this case, the first busbar, the insulation layer and the second busbar are arranged overlapping one another or one above the other in the axial direction. In particular, the two busbars and the insulation layer may be perpendicular to the axial direction of the space.

In some embodiments, the first busbar may be essentially in the shape of a star or circular disk with radially extending first contact portions. In this case, the first contact portions are each physically and electrically connected to one of the first current terminals of the capacitor. Analogously, the second busbar may be in the shape of a star or circular disk with radially extending second contact portions. The second contact portions are in this case each physically and electrically connected to one of the second current terminals of the capacitor.

In some embodiments, the first busbar has a first electrical terminal element for connecting a first current conductor to the first busbar, and thus to the capacitor, and a first cutout for conducting a second conductor through to a second electrical terminal element. Analogously, the second busbar may have the second terminal element for connecting the second current conductor to the second busbar, and thus to the capacitor, and a second cutout for conducting the first current conductor through to the first terminal element. The first terminal element and the second cutout are in this case arranged (at least partially) one above the other (or designed as overlapping) in the axial direction of the space. Analogously, the second terminal element and the first cutout are (at least partially) arranged one above the other (or designed as overlapping) in the axial direction of the space. In some embodiments, the first and the second terminal element may form a screw connection, a rivet connection or a press connection.

In some embodiments, the first terminal element is formed as a third cutout in the first busbar, the third cutout having a smaller diameter than the second cutout. Accordingly, the first terminal as the third cutout is aligned with part of the second cutout in the axial direction of the space. Analogously, the second terminal element is formed, for example, as a fourth cutout in the second busbar, the fourth cutout having a smaller diameter than the first cutout. Accordingly, the second terminal element as the fourth cutout is aligned with part of the first cutout in the axial direction of the space.

In some embodiments, the first and the second cutout are designed as partially aligned with one another in the axial direction of the space. An area created by the partial alignment of the two cutouts similar to a through-hole through the two busbars is set up to attach the two aforementioned electrical conductors to the two busbars, and thus to the capacitor.

In some embodiments, the capacitor has a plurality of capacitor elements which are physically separate from one another and which are arranged extending around a space (next to one another along a closed line). The capacitor elements may be designed as capacitor windings. The bus bars connect the capacitor elements to one another in parallel. The a plurality of capacitor elements or capacitor windings that are physically separate from one another in this case take the place of a large capacitor winding of a(n annular) capacitor (in the form of a ring or portion of a ring) that would otherwise be required.

In other words: an otherwise large-sized capacitor winding of a(n annular) capacitor is divided into a plurality of comparatively small, physically separate capacitor elements or capacitor windings, in particular with a constant total capacitance. The thermal expansion of the individual, comparatively small capacitor elements or capacitor windings is low (with the same heat development) in comparison with the thermal expansion of a single, one-piece, and thus comparatively large-sized, capacitor winding of a comparable capacitor, and can be better compensated. Furthermore, the longitudinal axes of the capacitor windings are straight. The capacitor windings are lined up in the form of a ring; the longitudinal axes may in this case form a polygon.

In some embodiments, the capacitor furthermore has a capacitor holder, which is designed for supporting or holding the capacitor elements and for protecting the capacitor elements from external, in particular mechanical, influences. The capacitor holder in turn has a plurality of holder portions, which each (receive and) securely hold (at least) one of the capacitor elements. Furthermore, the capacitor holder has a plurality of connecting portions, which physically or mechanically connect and securely hold the holder portions together. In this case, the holder portions are directly thermally connected to the respective capacitor elements.

As a result, the holder portions expand under the same thermal effect as the capacitor elements held therein, in particular synchronously with the respective capacitor elements. The material-related difference between the thermal expansion of the capacitor elements on the one hand and the thermal expansion of the respective corresponding holder portions on the other hand is comparatively small thanks to the small size of the individual capacitor elements, and can therefore be better compensated for by the respective holder portions without the holder portions breaking immediately. Likewise, the connecting portions which are arranged between the holder portions and physically connect them to one another can cushion the thermal expansion of the capacitor elements and the holder portions (and thus the entire capacitor) due to their own thermal expansion.

In some embodiments, the capacitor holder, and thus also the holder portions and the connecting portions, are made of an electrically isolating and elastic plastic or an electrically isolating and elastic material, and can thus almost completely compensate for the thermal expansion of the capacitor elements. In particular, the capacitor holder is made in one piece. For example, the capacitor holder is manufactured in an injection-molding process.

In some embodiments, the holder portions and the connecting portions are arranged alternately extending around the space.

In some embodiments, the holder portions each enclose (at least) one of the capacitor elements in its respective circumference (or circumferential direction) at least partially in the form of a casing, and thus form an encasing for the respective capacitor elements, which securely holds the respective capacitor element and protects it from any external influences there may be, such as for example external mechanical shocks.

In some embodiments, the holder portions each have at least one (first) expansion compensation area, which is designed as narrower and/or thinner in comparison with the rest of the respective capacitor holder, and is thus set up to compensate for a (for example thermally induced) expansion of the respective corresponding capacitor element in its circumferential direction. In particular, the expansion compensation area is formed narrower than the rest of the respective holder portion in a web-shaped manner (when viewed in the circumferential direction of the respective corresponding capacitor element).

In some embodiments, the connecting portions each have at least one (second) expansion compensation area, which is designed as narrower and/or thinner in comparison with the rest of the respective connecting portion, and is therefore set up to compensate for, for example thermally induced, expansion of the capacitor elements or the capacitor in a circumferential direction of the capacitor. In particular, the expansion compensation area is formed narrower than the rest of the respective connecting portion in a web-shaped manner (when viewed in the circumferential direction of the capacitor).

In some embodiments, the connecting portions are themselves web-shaped or in the form of connecting webs that extend in the circumferential direction of the capacitor or of the space and respectively each physically connect two holder portions that are adjacent in the circumferential direction of the capacitor to one another.

The capacitor assembly described above can be used in all electrical or power-electrical devices that require a capacitor and are subject to high thermal fluctuations due to their function.

In some embodiments, a vehicle-drive power electronics device, specifically a vehicle-drive power inverter device has a capacitor assembly as described above and an inverter, the inverter being designed to convert a direct current into a multi-phase alternating current and/or vice versa and having direct-current terminals for transferring the direct current. In this case, the capacitor assembly is electrically connected to the direct-current terminals. In general, a vehicle-drive power electronics device which has a capacitor assembly such as that described here as an intermediate circuit capacitor may be provided.

DETAILED DESCRIPTION

FIG. 1 shows a conventional annular capacitor RK in a schematic three-dimensional view from below. The annular capacitor RK has a ring-shaped capacitor winding body, which is arranged in a protective housing. On a bottom surface BF in the shape of a circular disk, the annular capacitor RK has a plurality of pairs of terminal lugs, each consisting of an inner first terminal lug AL1 and an outer second terminal lug AL2, which protrude from the housing and form electrical terminals of the annular capacitor RK with respect to external electrical devices. The pairs of terminal lugs AL1, AL2 are in this case arranged distributed equidistantly from one another in a circumferential direction UR of the annular capacitor RK. Furthermore, the terminal lugs AL1, AL2 each have a contact surface that extends flatly, parallel to the bottom surface BF. There is a group of individual capacitor contacts provided along an inner circle and a group of individual capacitor contacts provided along an outer circle.

Figure 2:
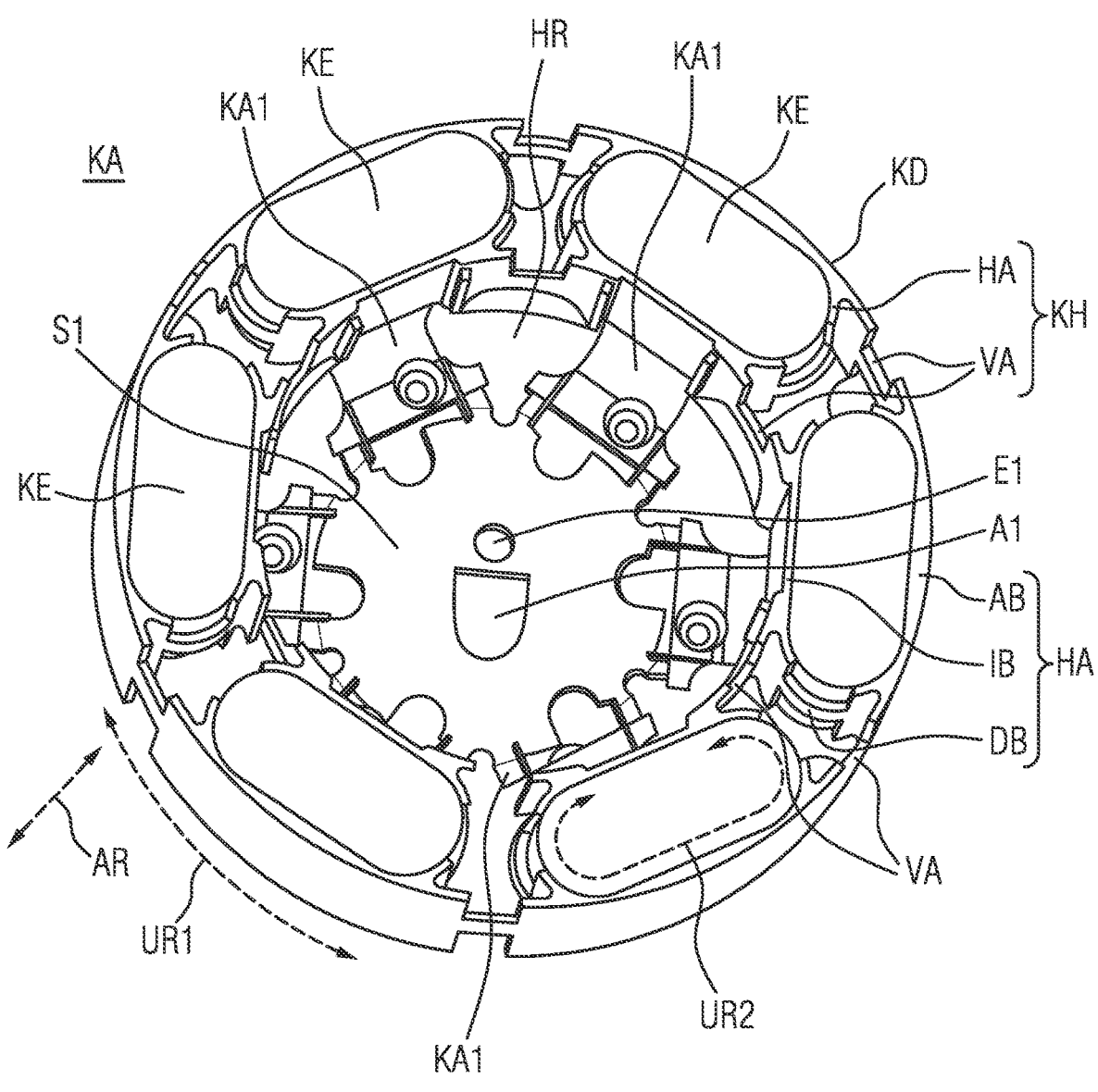
FIG. 2 shows part of a capacitor assembly incorporating teachings of the present disclosure in a schematic three-dimensional view from above.

FIG. 2 shows part of a capacitor assembly KA incorporating teachings of the present disclosure in a schematic three-dimensional view from above. The capacitor assembly KA is designed, for example, as an intermediate circuit capacitor of a vehicle-drive power inverter device. The vehicle-drive power inverter device has in addition to the capacitor assembly KA a power inverter. The power inverter has two direct-current terminals, at which the capacitor assembly KA is electrically connected.

The capacitor assembly KA has a ca"acit'r KD, which in turn has six capacitor elements KE, which are designed as physically separate from one another (as mutually independent parts). The capacitor elements KE are each essentially cylindrical, with an essentially oval cross section and (similar to stator segments of an electric motor stator) are arranged next to one another extending around a cavity HR in its circumferential direction UR1. The capacitor elements KE are in this case each formed as a capacitor winding whose winding axes are each aligned parallel to an axial direction AR of the cavity HR.

The capacitor KD furthermore has a capacitor holder KH, which supports the capacitor elements KE, securely holds them together and also protects them from any external influences there may be, such as for example external mechanical shocks. In this case, the capacitor holder KH is made in one piece from an electrically isolating and elastic plastic or an electrically isolating and elastic material, for example in an injection-molding process.

The capacitor holder KH has six ho"der 'ortions HA and twelve connecting portions VA, the holder portions HA and the connecting portions VA being arranged surrounding the cavity HR and alternating with one another. The central axes of the capacitor elements KE each form a polygon. The connecting portions VA are formed at some or all of the corners of the polygon and, because of their web-shaped formation, can absorb deformations of the capacitor elements KE.

The holder portions HA are each formed essentially In the shape of a cylinder casing and each enclose one of the capacitor elements KE in its respective circumferential direction UR2 in the shape of a casing, and thus support and securely hold the capacitor elements KE, for example by static friction. In this case, holder portions HA do not have a homogeneous width when viewed in their respective circumferential direction or in the circumferential direction UR2 of the respective corresponding capacitor elements KE. Rather, the holder portions HA each have an outer area AB, an inner area IB and two expansion compensation areas DB, with the expansion compensation areas DB physically connecting the outer area AB and the inner area IB in the circumferential direction UR2 of the respective holder portion HA.

The expansion compensation areas DB (when viewed in the circumferential direction UR2 of the respective holder portion HA or the respective corresponding capacitor element KE) are designed as significantly narrower in comparison with the outer and the inner areas AB, IB (with a significantly smaller width). Due to their small width and the material used for the capacitor holder KH, the expansion compensation areas DB are elastically deformable, and can thus compensate for temperature-related or age-related expansions of the respective capacitor elements KE in their respective extent. As a result, the expansion compensation areas DB protect the holder portions HA, and thus the capacitor holder KH, from damage such as breakages caused by the expanding capacitor elements KE. The outer areas AB of the holder portions HA, which form an outer boundary of the capacitor holder KH, and the inner areas IB, which form an inner boundary of the capacitor holder KH, give the capacitor holder KH the required mechanical stability. The holder portions HA are open on at least one side in the axial direction AR of the cavity HR or the capacitor assembly KA, in order to be able to insert the capacitor elements KE.

The connecting portions VA are web-shaped and physically connect the holder portions HA to one another. In this case, two connecting portions VA are arranged between each two adjacent holder portions HA. One of the two connecting portions VA between the respective two adjacent holder portions HA in each case connects the outer areas AB of the two holder portions HA directly to one another in the circumferential direction UR1 of the cavity HR (or the capacitor holder KH).

Another of the two connecting portions VA between the respective two adjacent holder portions HA in each case connects the inner areas IB of the two holder portions HA directly to one another in the circumferential direction UR1 of the cavity HR (or the capacitor holder KH). The connecting portions VA (when viewed in the circumferential direction UR2 of the respective corresponding holder portions HA or the respective corresponding capacitor elements KE) are designed as significantly narrower in comparison with the outer and the inner areas AB, IB of the holder portions HA (with a significantly smaller width). The connecting portions VA are elastically deformable due to their small width and due to the material used for the capacitor holder KH, and can thus compensate for temperature-related expansion of the capacitor holder KH.

Figure 5:
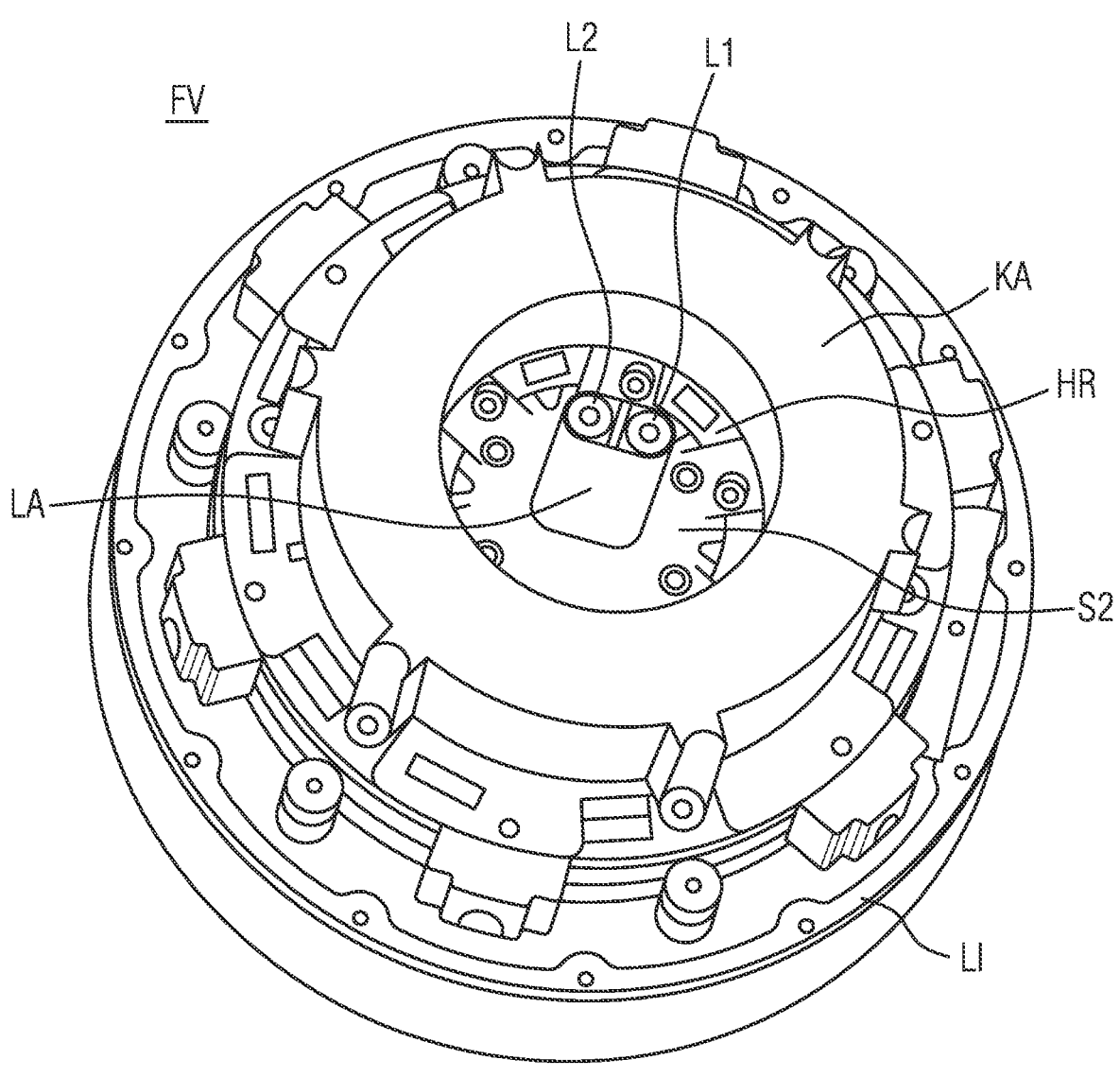
FIG. 5 shows part of a vehicle-drive power inverter device with a capacitor assembly from FIG. 4 in a schematic spatial view from above.

The capacitor assembly KA furthermore has a first busbar S1 and a second busbar S2 (see FIG. 3), which produce electrical connections from the respective capacitor elements KE to current conductors L1, L2 (see FIG. 5). In this case, the busbars S1, S2 are formed from a sheet of copper, for example by stamping or laser-beam cutting. The busbars S1, S2 are of essentially the same form and each have a circular disk-shaped central piece and six contact portions KA1 and KA2 extending radially away from the central piece in the same plane (see FIG. 3).

The busbars S1, S2 are arranged in the cavity HR or in the axial direction AR of the cavity HR in alignment with the cavity HR, perpendicularly to the axial direction AR and overlapping one another. To electrically isolate the two busbars S1, S2 from one another, the capacitor assembly KA has an electrically isolating insulation layer, which is arranged between the two busbars S1, S2 and physically connects the two busbars S1, S2 to one another and at the same time electrically isolates them from one another.

Figure 3:
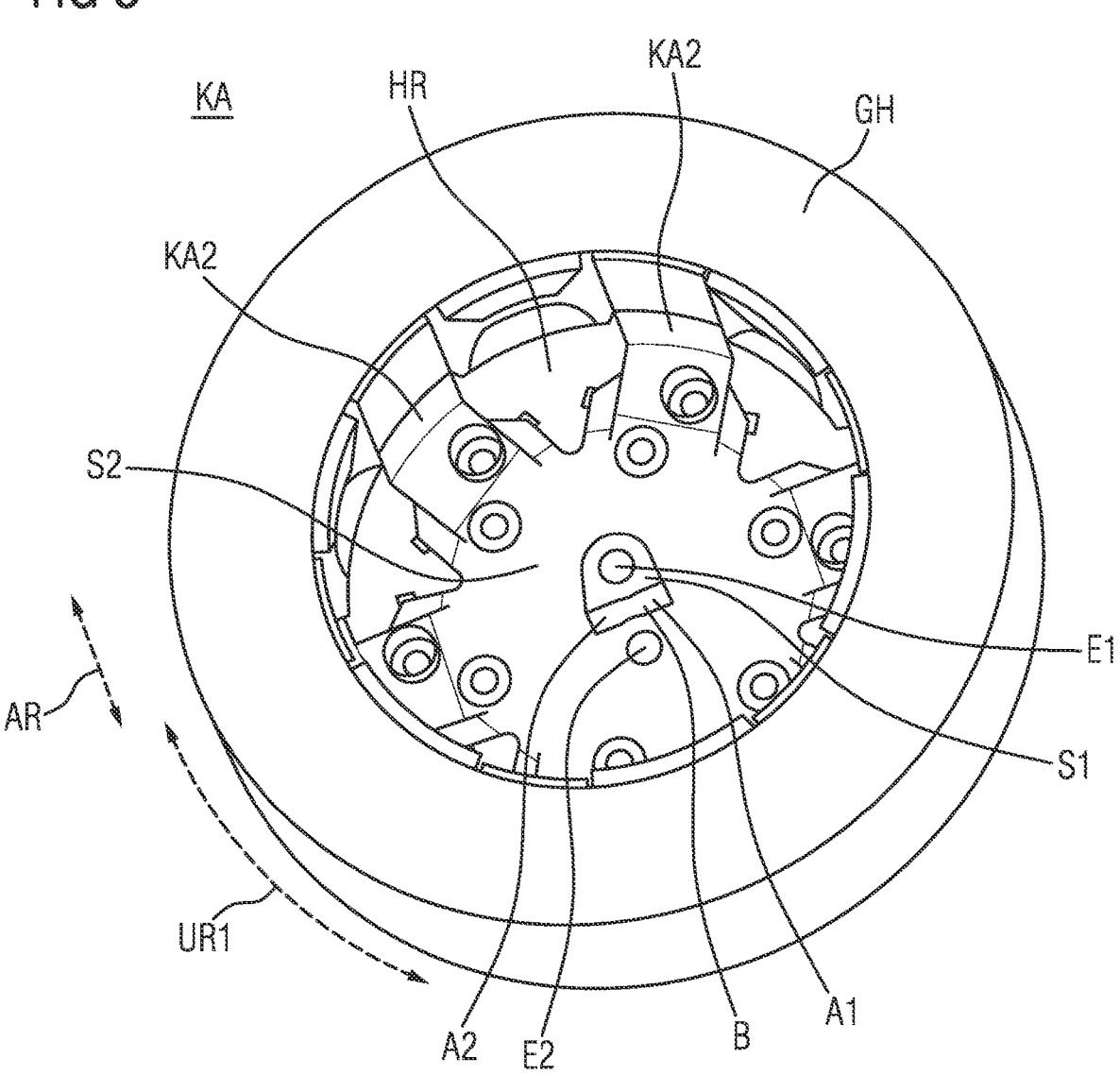
FIG. 3 shows the capacitor assembly from FIG. 2 in a further schematic three-dimensional view from above.

The first busbar S1 is physically and electrically connected to a first, positive-voltage-side current terminal of the respective capacitor elements KE (for example by welded connections) via six first contact portions KA1, which extend radially away from the circular disk-shaped central piece of the first busbar S1. Analogously, the second busbar S2 is physically and electrically connected to a second, negative-voltage-side current terminal of the respective capacitor elements KE (for example by welded connections) via six second contact portions KA2, which extend radially away from the circular disk-shaped central piece of the second busbar S2 (FIG. 3).

The first busbar S1 has a first electrical terminal element E1, which is formed in the central area of the circular disk-shaped central piece of the first busbar S1 and is set up so that a first, positive-voltage-side current conductor L1 can be connected to produce an external current connection of the capacitor assembly KA. Analogously, the second busbar S2 has a second electrical terminal element E2, which is formed in the central area of the circular disk-shaped central piece of the second busbar S2 and is set up so that a second, negative-voltage-side conductor L2 can be connected to produce the external current connection of the capacitor assembly KA (see FIG. 3). The two terminal elements E1, E2 are in this case each designed in the form of a through-hole (or as a cutout in the respective busbar S1, S2), into which the respective conductors can be routed and attached to the respective busbars S1, S2, for example by screw, rivet or press-fit connections. Furthermore, the two terminal elements E1, E2 are arranged next to one another laterally offset from one another, when viewed in the axial direction AR of the cavity HR.

The first busbar S1 furthermore has a first cutout A1 in the form of a further through-hole for conducting the second current conductor through to the second terminal element E2. The first cutout A1 is in this case arranged overlapping with the second terminal element E2, when viewed in the axial direction AR of the cavity HR. The first cutout A1 has in this case a comparatively larger diameter than the second terminal element E2, which is also designed as a cutout. As a result, the second terminal element E2 is aligned in the axial direction AR of the cavity HR with part of the first cutout A1.

Analogously, the second busbar S2 has a second cutout A2 in the form of a further through-hole for conducting the first current conductor through to the first terminal element E1. The second cutout A2 is in this case arranged overlapping with the first terminal element E1, when viewed in the axial direction AR of the cavity HR. The second cutout A2 has in this case a comparatively larger diameter than the first terminal element E1, which is also designed as a cutout. As a result, the first terminal element E1 is aligned in the axial direction AR of the cavity HR with part of the second cutout A2 (see FIG. 3).

The two busbars S1, S2 are stamped, cut or laser-beam cut from a metal sheet, for example a copper sheet or a copper alloy sheet, and shaped, for example bent, into the forms described above.

FIG. 3 shows the capacitor assembly KA described above in a further schematic three-dimensional view from above. The capacitor assembly KA has a housing GH which, or part thereof, is essentially in the form of a circular ring and, extending around the cavity HR, encloses the previously described capacitor elements KE and the capacitor holder KH together with the holder portions HA and the connecting portions VA.

FIG. 3 shows the second busbar S2 together with the second terminal element E2 designed as a through-hole and the second cutout A2. It can also be clearly seen that the second busbar S1 is designed as essentially overlapping with the first busbar S1. Furthermore, the overlapping arrangements of the second cutout A2 with the first terminal element E1, designed as a through-hole, or of the first cutout A1 with the second terminal element E2 can be clearly seen. Furthermore, the first and the second cutout A1, A2 are designed as partially aligned with one another in the axial direction AR of the cavity HR. Due to the partial alignment, the two busbars S1, S2 have a common area B, which extends through the two busbars S1, S2 in a way similar to a through-hole. The area B is set up to align or mechanically attach the two aforementioned electrical conductors L1, L2 to the two busbars S1, S2, and thus to the capacitor assembly KA.

Figure 4:
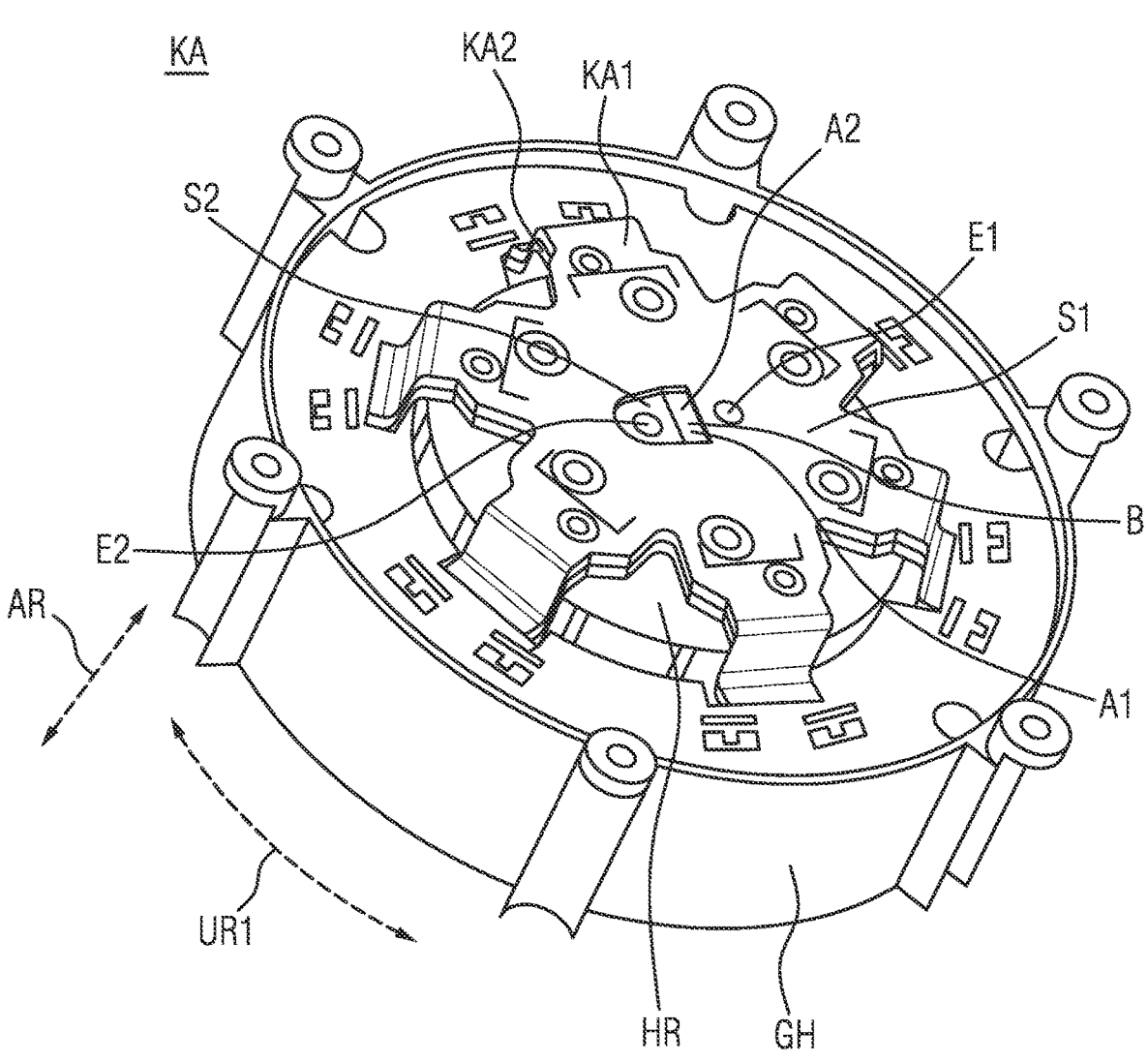
FIG. 4 shows the capacitor assembly from FIG. 3 in a schematic three-dimensional view from below.

FIG. 4 shows the capacitor assembly KA described above in a schematic three-dimensional view from below. The physical and electrical connections of the two busbars S1, S2 to the respective capacitor elements KE are shown schematically in FIG. 4. The six capacitor elements KE each have a positive-voltage-side current terminal and a negative-voltage-side current terminal, which are shaped similarly to the annular capacitor RK shown in FIG. 1 in the form of terminal lugs AL1, AL2, each with a contact surface of a flat extent. The pairs of terminal lugs (the positive-voltage-side current terminal and the negative-voltage-side current terminal) of the respective capacitor elements KE (according to the arrangement of the capacitor elements KE relative to one another) are in this case arranged equidistantly from one another in the circumferential direction UR1 of the cavity HR.

The contact surfaces of the terminal lugs may extend parallel or perpendicularly to the axial direction AR. In some embodiments, the contact surfaces of the terminal lugs of the positive-voltage-side current terminals of all capacitor elements KE may extend parallel to the axial direction AR and the contact surfaces of the terminal lugs of the negative-voltage-side current terminals of all capacitor elements KE may extend perpendicularly to the axial direction AR (or vice versa).

The first busbar S1 is physically and electrically connected to the first, positive-voltage-side current terminals of the respective capacitor elements KE via the six first contact portions KA1. The six first contact portions KA1 in this case extend radially from the circular disk-shaped central piece of the first busbar S1 to the terminal lugs of the respective corresponding first positive-voltage-side current terminals of the respective capacitor elements KE and are physically and electrically connected to the respective corresponding terminal lugs (for example by welded connections) over a flat extent. Analogously, the second busbar S2 is physically and electrically connected to the second, positive-voltage-side current terminals of the respective capacitor elements KE via the six second contact portions KA2.

The six second contact portions KA2 extend radially from the circular disk-shaped central piece of the second busbar S2 to the terminal lugs of the respective corresponding second positive-voltage-side current terminals of the respective capacitor elements KE and are physically and electrically connected to the respective corresponding terminal lugs (for example by welded connections) over a flat extent. The two busbars S1, S2 thus connect the six capacitor elements KE to one another in parallel to an external electrical component, such as for example an external current source. The parallel connection of these six capacitor elements KE, or of the six pairs of terminal lugs, reduces the total lug inductance of the capacitor assembly KA to a sixth.

FIG. 5 shows, in a schematic three-dimensional view from above part of a vehicle-drive power inverter device FV with a capacitor assembly KA described above. The device FV has in addition to the capacitor assembly KA, for example as an intermediate circuit capacitor, a power inverter LI for converting a direct current into a multi-phase alternating current and/or vice versa, which is electrically connected to the capacitor assembly KA on the direct current side. The device FV has a conductor assembly LA, via which the capacitor assembly KA can be connected to an external direct-current source. The conductor assembly LA has the aforementioned first, rod-shaped, positive-voltage-side current conductor L1 and the aforementioned, second, rod-shaped, negative-voltage-side current conductor L2, which are partly integrated in an electrically isolating, likewise rod-shaped plastic support.

The conductor assembly LA is located in the cavity HR and is mechanically attached to the two busbars S1, S2. In this case, the first current conductor L1 extends through the second cutout A2 of the second busbar S2 and the first terminal element E1 (in the form of a through-hole) of the first busbar S1 and is attached to the first busbar S1, such as for example screwed, riveted or welded. Because the second cutout A2 has a comparatively larger diameter than the first terminal element E1, which is also designed as a cutout, the first current conductor L1 does not touch the edge of the second cutout A2, and thus the second busbar S2. Analogously, the second current conductor L2 extends through the first cutout A1 of the first busbar S1 and the second terminal element E2 of the second busbar S2 and attached to the second busbar S2, such as for example screwed, riveted or welded. Because the first cutout A1 has a comparatively larger diameter than the second terminal element E2, which is also designed as a cutout, the second current conductor L2 does not touch the edge of the first cutout A1, and thus the first busbar S1.

Because the two busbars S1, S2 are arranged in the cavity HR or in alignment with the cavity HR in the axial direction AR of the cavity HR, they allow space-saving electrical connections of the capacitor KD or all capacitor elements KE to the external electrical component, such as one external direct-current source. Because the two busbars S1, S2 are also arranged one above the other in the axial direction AR and are predominantly or, apart from a few areas, almost completely aligned with one another, they allow a low-inductance electrical connection from the capacitor KD or its capacitor elements KE to the external electrical component. The electrical insulation of the two busbars S1, S2 from one another takes place by means of an electrically isolating insulation layer (insulator), which is arranged between the two busbars S1, S2 and physically connects the two busbars S1, S2 to one another and at the same time electrically isolates them from one another.

FIG. 5 shows an embodiment of the capacitor assembly KA which has individual capacitor elements, which are lined up circumferentially along a closed line (polygon or circular line). The capacitor elements are aligned along the closed line. In the interior of the capacitor assembly KA, around which the capacitor elements are arranged, there are two busbars, by means of which the capacitor windings are connected in parallel. The busbars are assigned to different potentials. The busbars each have contact portions, which extend from a central portion via which they are electrically connected.

The contact portions are electrically connected to current terminals of the capacitor elements. The current terminals of the capacitor elements protrude (radially) into the interior of the capacitor assembly KA. The contact portions of the busbars protrude (radially) toward the current terminals. The busbars are stacked on top of one another (and separated by an insulator). Optional conductors lead (axially) away from the busbars and out from the interior of the capacitor (for further contacting). The electrical connections between the capacitor elements are provided inside the capacitor. This applies to both poles of the capacitor.

This is not the case with the capacitor of FIG. 1. The optional current conductors are likewise arranged inside the capacitor and preferably protrude from the interior of the capacitor or from an end face. This allows simple and low-induction contacting. The bus bars are provided on an end face of the capacitor, with this being counted as part of the interior of the capacitor. The current conductors shown protrude from the end face opposite thereto, but can also protrude through the same end face on which the busbars are also provided. With these properties, the capacitor assembly KA described above is optimally suited for power-electrical applications, such as in the vehicle-drive power inverter device FV mentioned above, where there are high requirements for space reduction and/or low-inductance current connections in the capacitor assembly.

What is claimed is:

1. A capacitor assembly comprising:
   an annular capacitor including a plurality of capacitors arranged at least partially around a circumference of a space, the annular capacitor including a first set of positive-voltage-side current terminals and second set of negative-voltage-side current terminals;
   a first bus bar electrically connected to each terminal in the first set of current terminals; and
   a second bus bar electrically connected to each terminal in the second set of current terminals;
   wherein at least one of the first busbar or the second busbar comprises a central portion disposed within the space and a set of arms extending therefrom and comprising contact portions for the corresponding current terminals.

2. The capacitor assembly as claimed in claim 1, wherein the first current terminals and/or the second current terminals are distributed in a circumferential direction of the space.

3. The capacitor assembly as claimed in claim 1, wherein the first busbar and the second busbar are arranged in the space or in alignment in the axial direction of the space.

4. The capacitor assembly as claimed in claim 1, the first busbar and the second busbar overlap one another.

5. The capacitor assembly as claimed in claim 1, further comprising an electrically isolating insulation layer;
   wherein the first busbar, the insulation layer, and the second busbar overlap one another;
   the insulation layer is arranged between the first busbar and the second busbar; and
   the first busbar and the second busbar are physically connected to one another and electrically isolated from one another.

6. The capacitor assembly as claimed in claim 1, wherein the first busbar and the second busbar are arranged perpendicularly to the axial direction.

7. The capacitor arrangement as claimed in claim 1, wherein:
   the first busbar has a first electrical terminal element for connecting a first current conductor and a first cutout for conducting a second current conductor through to a second electrical terminal element;

the second busbar has the second terminal element for connecting the second current conductor and a second cutout for conducting the first current conductor through to the first terminal element;

the first terminal element and the second cutout arranged one above the other in the axial direction of the space; and the second terminal element and the first cutout arranged one above the other in the axial direction of the space.

8. The capacitor assembly as claimed in claim 7, wherein the first terminal element forms a third cutout in the first busbar, the third cutout having a smaller diameter than the second cutout; and/or the second terminal element forms a fourth cutout in the second busbar, the fourth cutout having a smaller diameter than the first cutout.

9. The capacitor assembly as claimed in claim 7, wherein the first cutout and the second cutout are partially aligned with one another in the axial direction of the space.

10. The capacitor assembly as claimed in claim 1, wherein the first busbar and/or the second busbar is stamped, cut or laser-beam cut from a metal sheet, a copper sheet, or a copper alloy sheet.

11. The capacitor assembly as claimed in claim 1, wherein the annular capacitor furthermore comprises a capacitor holder for holding the capacitor elements, the capacitor holder having a plurality of holder portions each supporting and securely hold one of the capacitor elements, and a plurality of connecting portions, which physically connect the holder portions to one another.

12. The capacitor assembly as claimed in claim 11, wherein the holder portions and the connecting portions are arranged alternately extending around the space.

13. The capacitor assembly as claimed in claim 11, wherein the holder portions each enclose one of the annular capacitor elements in its respective circumferential direction at least partially in the manner of a casing.

14. The capacitor assembly as claimed in claim 11, wherein the holder portions each have at least one first expansion compensation area narrower and/or thinner in comparison with the rest of the respective capacitor holder and is set up to compensate for expansion of the respective corresponding annular capacitor element in its circumferential direction.

15. The capacitor assembly as claimed in claim 11, wherein the connecting portions each have at least one second expansion compensation area narrower and/or thinner in comparison with the rest of the respective connecting portion and is set up to compensate for expansion of the annular capacitor elements or the capacitor in a circumferential direction of the capacitor.

16. A vehicle-drive power electronics device comprising:

an annular capacitor including a plurality of capacitors arranged at least partially around a circumference of a space, the capacitor including first, positive-voltage-side current terminals and second, negative-voltage-side current terminals;

a first bus bar electrically connected to the first current terminals;

a second bus bar electrically connected to the second current terminals;

wherein at least one of the first busbar or the second busbar comprises a central portion disposed within the space and a set of arms extending therefrom and comprising contact portions for the corresponding current terminals;

wherein both the first and the second busbar extend parallel to or obliquely to an end face of the space; and an inverter for converting a direct current into a multi-phase alternating current and/or vice versa with direct-current terminals for transferring the direct current;

wherein the capacitor assembly is electrically connected to the direct-current terminals.

\* \* \* \* \*